DYNAMIC MEMORY DEVICE USING ELECTRICAL PULSES

Filed May 16, 1956 4 Sheets-Sheet 1

INVENTOR.
Richard Friedrich Josef Filipowsky
BY
Wenderoth, Lind & Ponack
ATTYS.

Jan. 20, 1959 R. F. J. FILIPOWSKY 2,870,432

DYNAMIC MEMORY DEVICE USING ELECTRICAL PULSES

Filed May 16, 1956 4 Sheets-Sheet 2

INVENTOR.

BY

Richard Friederich Josef Filipowsky.

Wenderoth, Lind & Ponack ATTYS.

DYNAMIC MEMORY DEVICE USING ELECTRICAL PULSES

INVENTOR.
Richard Friedrich Josef Filipowsky,
BY
Wenderoth, Lind & Ponack
ATTYS.

Jan. 20, 1959 R. F. J. FILIPOWSKY 2,870,432

DYNAMIC MEMORY DEVICE USING ELECTRICAL PULSES

Filed May 16, 1956 4 Sheets-Sheet 4

INVENTOR.
Richard Friedrich Josef Filipowsky
BY
Wenderoth, Lind & Ponack
ATTYS.

United States Patent Office 2,870,432

Patented Jan. 20, 1959

2,870,432

DYNAMIC MEMORY DEVICE USING ELECTRICAL PULSES

Richard Friedrich Josef Filipowsky, Glen Burnie, Md., assignor to Companhia Portuguesa Radio Marconi, S. A. R. L., Lisbon, Portugal Application May 16, 1956, Serial No. 585,213

Claims priority, application Portugal June 20, 1955

7 Claims. (Cl. 340—173)

The present invention relates to an electric storage device (electric memory) which is in a position to store any information up to its maximum storage capacity, over any length of time, which is prepared to accept information at any instant and to release it again at any arbitrary instant, if required even with a speed different from the one, with which the information had been received. The device is thus operable as a frequency changer (time compressor or expander).

Many electric storage devices (electric memories) are already known. They may be classified as static and dynamic memories. The first class may include all devices where the storage is achieved by transferring electrical signals to a different medium (optical, as in film, magnetic as in tape and wire recorders) or by storing them in electrostatic form (storage tubes). The first group generally requires mechanically moving parts, whereas the second group requires usually two cathode ray beams, one for registering, one for reproducing. In the first group it is difficult to release the information at arbitrary instants, whereas devices of the second group require two electron guns and a complicated target (mosaic) inside the tube which possesses a rather limited storage capacity. Moreover, it is difficult, due to secondary electron effects, to achieve highest accuracy and perfect preservation when storing arbitrary waveforms.

The present invention may be called a dynamic memory as it keeps electrical pulses permanently circulating in closed loop delay devices. The fundamental idea is to use any form of local pulse modulation for transferring the information to be stored first to a modulated pulse train. The sampling rate is at least twice the period of the highest frequency component of the input waveform. The duration of the pulses should be very small compared with the pulse repetition period of the train, thus keeping a long interval free of signals between any two pulses. As this pulse train is only operating within a given equipment and is not required to run over a long distance communication channel, there is no difficulty in providing the required bandwidth of amplifiers and delay lines for such extremely short pulses. As the noise inside an equipment can be kept well under control and as the signals can be of considerable amplitude, it is possible to use pulse code modulation with digits of much higher order than binary, thus taking advantage of the possibility to insert regenerative repeaters without being forced to extend the bandwidth so much as for binary coding.

For regaining the stored information, the modulated pulse train is transferred by gating devices to an output circuit and the original wave form is regained by a normal pulse demodulation process. According to the present invention the period of the pulse repetition frequency (PRF) of the train is an integer multiple of the circulation time of the loop plus one modulation interval (pulse width in case of PAM) of a single pulse. Assume that said integer multiple is one. In this case the first pulse entering the loop will have finished one cycle, when the second pulse is arriving at the input to the loop; both pulses will continue to circulate, one close after the other. After one more cycle the third pulse will be attached to this group and so on, until the storage capacity of the loop will not permit any more pulses to be added, i. e. until the last pulse will be close to the first pulse in the circulating and densely packed train.

It is evident that, by following this principle, the complete pulse train can be released at any instant with a maximum delay of one period of the PRF. A switching device at the output has to release the first pulse first, but has to close immediately thereafter the loop again to force the second pulse to perform one more cycle. Then the second pulse can be released and so on, until all the pulses will be again arranged to a pulse train of the given PRF and in their original sequence. A marker pulse may identify the beginning of any stored information, whenever such procedure might be required. The storage capacity of a single loop (the number of pulses to be stored) is limited to the ratio between the period of the PRF to the width of one modulation interval. The delay time for releasing pulses can be reduced by reducing the circulation time of the loop to a simple fraction of the repetition period, for example ½, ⅓, ¼ $1/n$ ($n$ being an integer number), less one width of a modulation interval. The storage capacity will be reduced by the same fraction. If it is required to keep the pulses circulating for very long times, it is necessary to insert an amplifier, preferably one with possibility to regenerate (reshape) the pulse waveform.

It is one object of the invention to provide a device for storing (registering) information with a possibility of releasing it simultaneously with the storing process, but also independently at irregular or regular intervals. The gate accepting the information may work quite independently of the gate releasing the information.

It is an other object of the invention to operate the device as a time compressor or time expander, or what has practically the same meaning, as a frequency changer (converter). For this mode of operation it is merely required to make the period of the PRF a large integer multiple of the circulation time of said loop plus one width of a pulse modulation interval. Each pulse will then perform a large number of circulations, say $n$-circulations, within the loop before the next pulse will join it. If during the release process each pulse is switched to the output $n_1$ circulations after the previous pulse was released, the output pulse train will have exactly the same PRF as the input pulse train, whenever $n=n_1$. The device operates in this case as storage device without alteration of the time scale. If however $n>n_1$, i. e. if the output train has a higher PRF than the input train, the device operates as a time compressor (or frequency converter), which increases all frequency components linearly with a factor $n/n_1$. On the other side, the device may operate as a time-expander, whenever $n>n_1$.

According to one feature of the invention several loops can be used in one and the same system whenever the storage capacity of a single loop is insufficient. The output of the first loop will be connected to the input of the second. Preferably one will make the circulation time of the second loop an integer multiple of the circulation time of the first one. It is then possible to transfer the packed pulses of the first loop as a whole to the second loop and let this pulse packet circulate therein, until the first loop is again completely filled, whence the second packet should be transferred to the second loop at such an instant that it closely might follow the first packet when circulating in the second loop. In this manner larger and larger closed loop storage devices, like delay lines, ultrasonic lines and finally closed loop magnetic tapes or similar mechanically moved storage devices, may be employed.

According to an other feature of the invention, it is possible to secure any arbitrarily small delay time when responding to a release order, by employing the reversed principle at the output side, i. e. by transferring pulse packets from larger to shorter and shorter loops until they are released from the shortest loop with correct intervals.

According to a similar feature of the invention, the device may be required to accept and to release information simultaneously, especially with different speeds. It is then advisable to apply the above-mentioned principle of loops being arranged in series connection, whereby the storage capacity should increase from the smallest one to highest one and again decrease to the smallest one, when proceeding from input to output. Switching means are then required to direct any new pulse series into the empty device in such a way, that first the smallest loop at the output is filled, then the smallest loop at the input, then the second smallest loop at the output, thereafter the second smallest loop at the input and so on. Pulses have also to be transferred in the same sequence from one loop to another.

In certain applications it will be advisable to control all switching actions from a central timer and to synchronise the gating of the various loops.

The present invention is of particular advantage in communication and computer systems, where short time storage devices are required. Many recent proposals for redundancy reducing communication systems depend on a device, which may accept and release information practically without delay, but at different times and frequently also with different speed.

Practical forms of the invention and further features of the invention will now be described with reference to the drawings filed with this specification in which.

Figure 1:
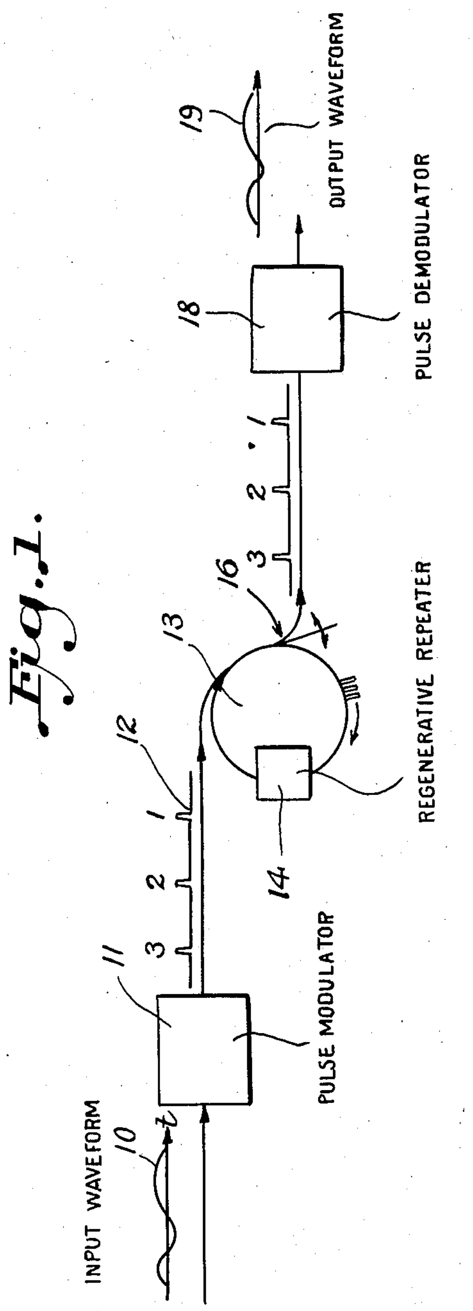
Figure 1 shows diagrammatically the principal operation of the invention.

Figure 1 demonstrates the principal operation of a dynamic memory. The input signal 10 is to be stored within the memory. It is first sampled by the pulse modulator 11 and its information is transferred in any convenient pulse modulation system to the pulse train 12. Assume that the pulses contain the information in PAM (pulse amplitude modulation). They enter over the switch 16 the delay loop 13, which may be a delay network or an ultrasonic delay line or a delay cable or any other convenient delay system with constant transmission time and with a characteristic permitting relatively distortionless circulation of the pulses. If any quantized or cooled form of pulse modulation is employed, a regenerative repeater 14 can be inserted into the delay loop to maintain the waveform of the pulses during the full storage time. According to the invention, the pulse repetition period (interval between any two pulses in the train 12) is an integer multiple of the circulation time of the delay loop 13 plus the duration of one pulse modulation interval (in PAM one pulse duration). This means that pulse 1 of the train 13 will have finished an integer number of circulations over the loop 13, when pulse 2 is just due to enter the loop. It will therefore follow pulse 1 at a very close distance. After one further period of the pulse repetition frequency, the next pulse 3 will be added, and so on, until a closely packed group of pulses will fill the complete loop and will continue to circulate over the loop.

To release the information, the switch 16 will transfer the first pulse to the pulse demodulator 18, but will keep the second pulse circulating for an integer number of circulations more, until also this pulse will be switched to the pulse demodulator. By this process an output pulse train 17 is formed, which must not necessarily have the same PRF as the input pulse train. The waveform 19 is recovered in the output of the pulse demodulator 18. It may be merely a delayed reproduction of the input waveform, but it may also be a time-compressed or time expanded replica of the input waveform, depending on the number of circulations between the switching instants of 16.

Figure 2:
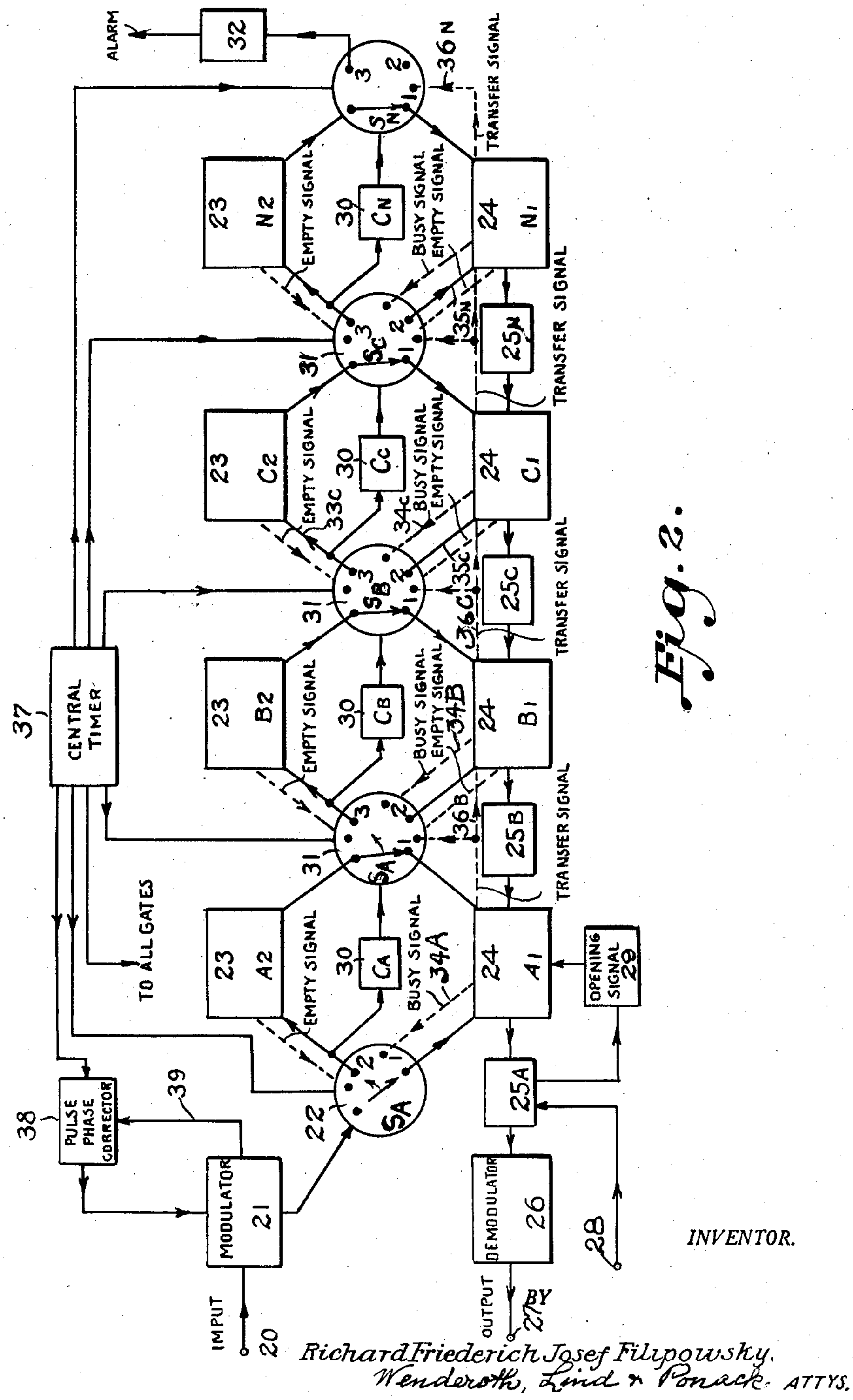
Figure 2 is a block schematic diagram illustrating one application of the invention with N pairs of storage devices.

Figure 2 shows a block schematic diagram of an embodiment of the invention with very large storage capacity and very short release delay, which is able to accept information in irregular intervals and release the information at a different rate and again in irregular intervals. The waveform (or signal) to be stored is inserted over input 20. It modulates sampling pulses in the pulse modulator 21 in any convenient pulse modulation form. The pulses are according to the invention extremely short, so that even in the case of pulse code modulation the complete pulse group of one sample might occupy only a very small fraction of one full period of the pulse train.

The equipment in Fig. 2 comprises further $n$ pairs of storage devices $A_1A_2$, $B_1B_2$ . . . $N_1N_2$ indicated at 23 and 24. Their storage capacity increases from left to right and devices with the same letter (forming one pair) have exactly the same storage capacity. $A_1$ and $A_2$ have the smallest capacity and are preferably delay lines, $N_1$ and $N_2$ have the largest capacity and may be magnetic tapes or drums with a large bandwidth, for example as they are used for video recording. The storage devices are marked in alphabetical order and in this order any one should be in a position to accommodate exactly an integer multiple of the number of said short pulses, which the previous one can accommodate.

The equipment comprises further N counting circuits 30 ($C_A$, $C_B$, . . . $C_N$) and N switches 31 ($S_A$, $S_B$, . . . $S_N$). Assuming the memory might be empty, before any information is accepted, then the input switch 22 will be in position "1" and all other switches 31 will also be in position "1." The modulated pulse train from the pulse modulator 21 will now be directed into the storage device $A_1$, where the pulses will be arranged in closely packed sequence as described above. As soon as the capacity of this storage device is reached a "busy" signal will be communicated over connection 34A to shift the switch 22 to position "2" filling now the storage device 23. Counter ($C_A$) 30 registers all pulses entering $A_2$ and as soon as this storage device is also filled, i. e. as soon as the counter has registered the maximum number of pulses, the switch 31 connected thereto is shifted to position "2" and the full packet of pulses stored in $A_2$ is transferred to $B_1$. The counter $C_A$ starts again counting from zero during the next filling period of the storage device $A_2$. As soon as $A_2$ is again completely full, the counter $C_A$ causes the switch $S_A$ to transfer the next package of pulses to the storage device $B_1$ and so on, until $B_1$ is completely filled. This condition is indicated over connection 34B by a "busy signal" to the switch $S_A$, which is now shifted to position "3" for transferring all successive packages from $A_2$ to $B_2$. Counter $C_B$ is checking the number of packages thus transferred to $B_2$ and it will cause switch $S_B$ to transfer the full content of the storage device $B_2$ to the much larger device $C_1$, as soon as $B_2$ is filled for the first time.

This process goes on by filling $C_1$, $C_2$ . . . $N_1$, $N_2$. Counter $C_N$ causes the switch $S_N$ to jump to position "3" and activate the alarm device 32, whenever the last large package of pulses from $N_1$ has been transferred to $N_2$, filling this largest storage device completely. There is still a short time left to answer the alarm device before the whole memory is completely filled, as all the other storage devices 23 have to be filled for the last time.

Usually the memory will not store so much information, but the release process will start long before the alarm device would indicate the approaching end of its ability to accept more information. The release process is initiated by an external trigger signal arriving over terminal 28. Gate 25A is then opened and pulse after pulse is transferred to the pulse demodulator 26 and the original or time-compounded (-compressed or -expanded) waveform becomes available at output terminal 27. Assuming that the memory was practically filled to its maximum capacity, we observe the following release process. The storage device $A_1$, which carries the first pulses, is first emptied. When the last pulse is leaving this device, a "transfer" signal is communicated over connection 36B to the gate 25B of the larger storage device $B_1$ from which the next package of pulses is transferred to $A_1$. Thereafter package after package is transferred from $B_1$ to $A_1$, whenever the "transfer signal" opens the gate 25B, after $A_1$ has been emptied again. After $B_1$ has been emptied, larger packages are transferred over gate 25C from $C_1$, which are again split into smaller packages by the same process. Thus finally $N_1$ will become empty and the "transfer signal" from $N_1$ will cause over connection 36N the switch $S_N$ to transfer the full content of $N_2$ into $N_1$.

If $N_1$ should be empty again and no more information has arrived in the meantime in $N_2$, $N_1$ will remain empty for a short time longer than when receiving a new transfer during the regular process having been described above. This condition causes an "empty signal" being communicated over connection 35N to the previous switch 31 (in this case $S_C$) causing its shift to position "2." If $C_2$ might be filled during the time before $C_1$ requires the next packet from $N_1$, its content will be transferred to $N_1$ and the empty signal will disappear. If this is not the case, the empty signal will remain at $S_C$, the switch will cause the switch $S_C$ to be shifted to position "1," as soon as a transfer signal appears on connection 36N. Now all the content of $C_2$ is immediately transferred to $C_1$, regardless of whether the storage device was full or not. If it was just full $C_1$ too will be full and a "busy signal" will communicate this fact over 34C to switch $S_B$, causing it to remain in position "3" regardless of the empty condition of $C_2$ reported over connection 33C. The next package from $B_2$ will now again be transferred to $C_2$. If however $C_2$ was not full, $C_1$ will also not be full, when having received the full content of $C_2$. No "busy signal" will appear over 34C and the switch will be shifted to position "2" as soon as the empty signal appears over 33C, without simultaneous appearance of a "busy signal" over 34C. Any further package from $B_2$ will now be transferred directly to $C_1$ until either the "busy signal" over 34C causes the switch to change to position "3" or the "empty signal" over 35C together with the transfer signal over 36C causes the switch $S_B$ to shift to position "1."

If no new information is arriving over modulator 21 but the release process is continuing, all the storage devices will be gradually discharged until the last pulse has left $A_1$. From the foregoing explanation it becomes evident that either the charging process or the discharging process may be interrupted at any time. Both processes may also run with different rates, which will be determined by the central timer 37 triggering all switches 31, counters 30 and gates 25. In place of the central timer individual time constants in the above elements may determine the rates of charging and discharging. In many applications it might be required that the information be accepted in quite irregularly dissected intervals and that the last pulse of one interval should be followed by the first pulse of the next interval within the storage device without any gap between regardless of the duration of the interruption of the information flux between the two intervals. This can be secured, by inserting a pulse-phase corrector 38 between the central timer 37 and the pulse modulator 21. This pulse phase corrector has to advance the phase of the sampling pulse for one pulse width (width of one modulation interval) for each period of the PRF during which no signal is received, i. e. during which the charging process is discontinued. This pulse-phase corrector will be disabled during any charging period of the memory.

To facilitate the gating of the pulses towards the output demodulator, or the gating of packages, when being transferred from storage device to storage device, it may be advisable to insert a special "opening pulse" in front of the first bit of information to be released or transferred from any storage device. Such an "opening pulse" may be inserted automatically whenever the release of information is interrupted. Device 21 should serve this purpose. Similar devices may be provided in connection with all the other gates.

Figure 3:
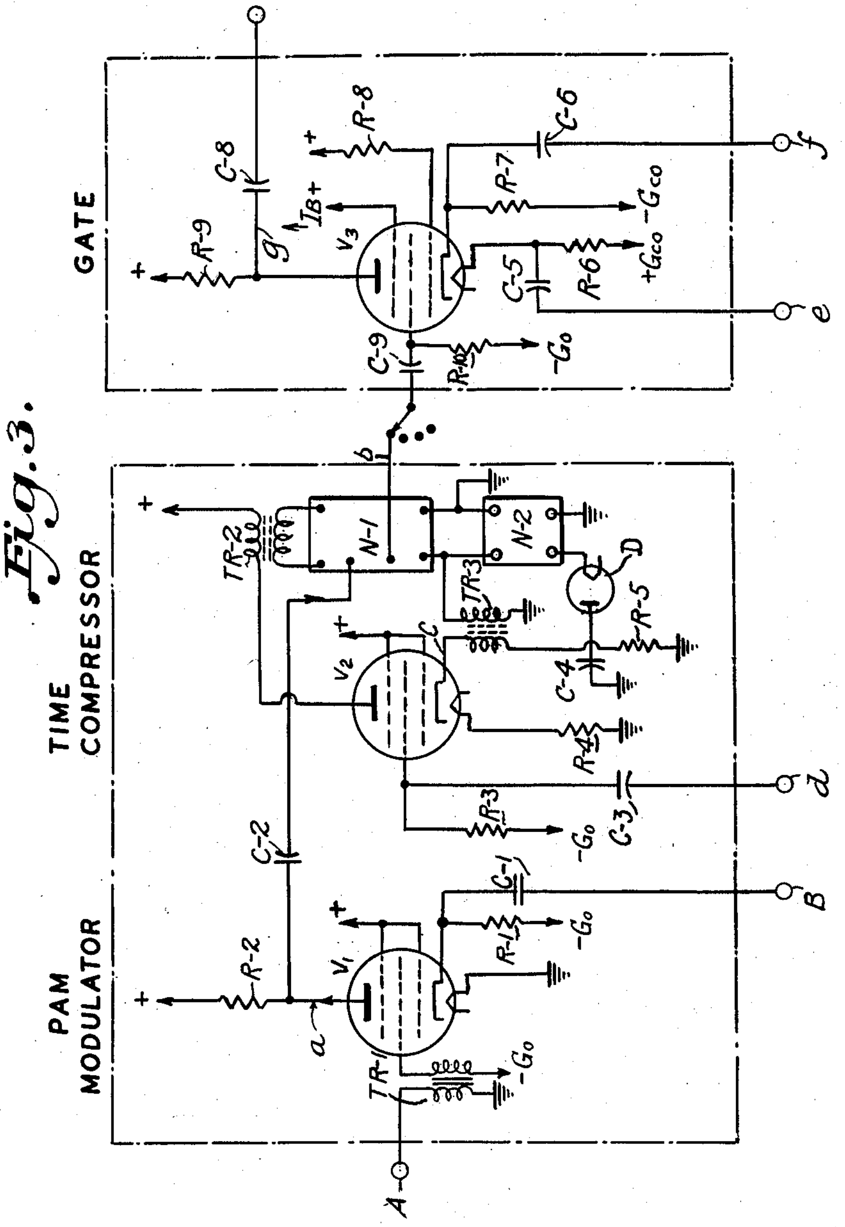
Figure 3 is a circuit arrangement for an application of the invention as time compressor.

Fig. 3 gives one example of a rather simple embodiment of the invention, where the dynamic memory is applied as a time compressor. It comprises only three tubes of which V–1 operates as a PAM-modulator, V–2 as input gate to feed the delay circle and V–3 as output gate to release the time-compressed pulse group. In this particular application it is intended to compress groups of 36 pulses in the time domain.

Figure 4:
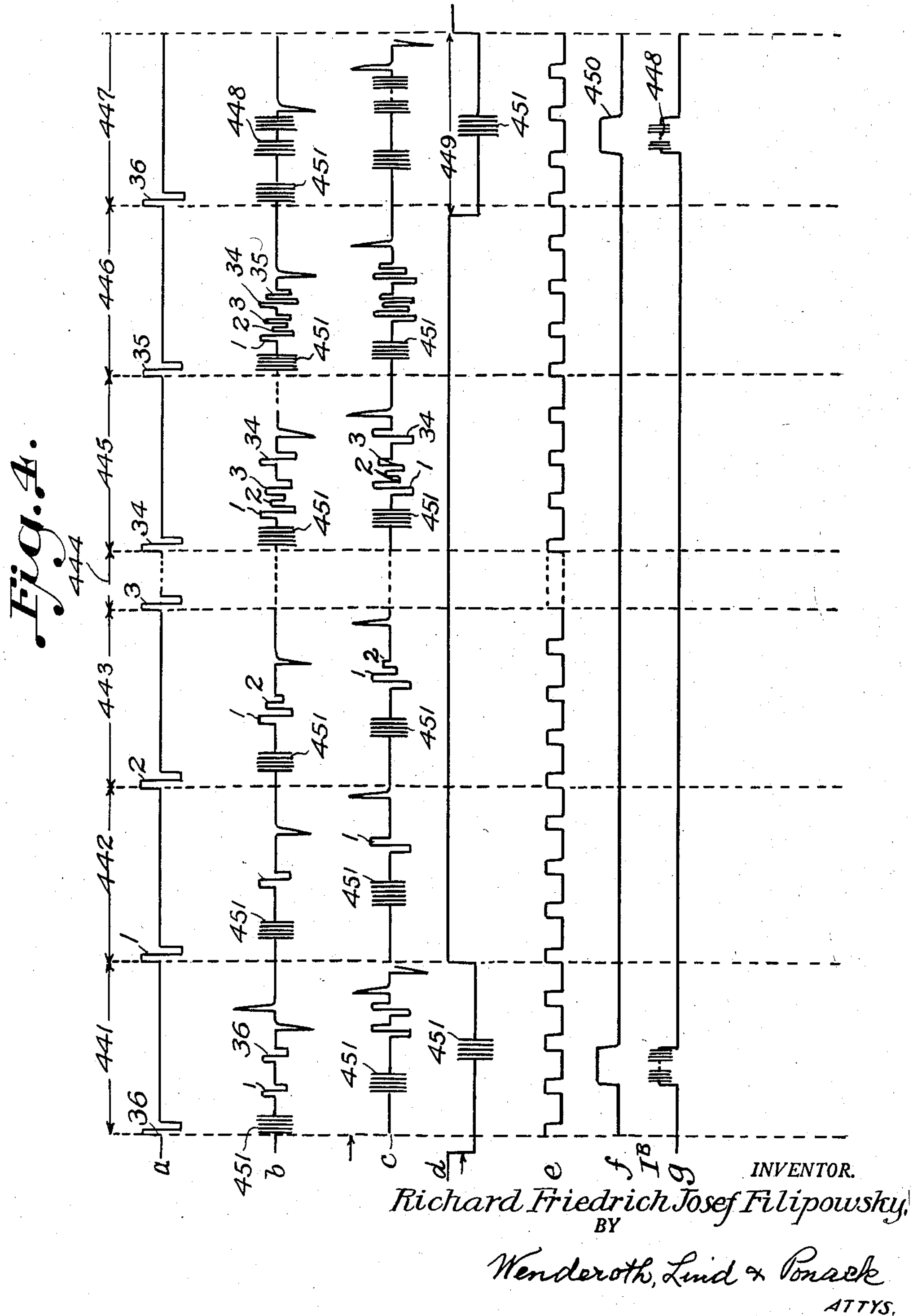
Figure 4 is a waveform diagram illustrating the operation of the circuit in Fig. 3.

Fig. 4 shows the waveforms as they may be checked by an oscillograph at the various points in the circuit of Fig. 3. The information to be stored is inserted at terminal A of Fig. 3 and over transformer submitted as control voltage to grid three of the PAM modulator tube V–1. The latter is correctly biased at grid one by a negative bias $-G_0$, but is controlled by positive sampling pulses arriving from terminal B over C–1 and across the grid leak resistor R–1. These sampling pulses are skew-symmetrical rectangular pulses to avoid any D. C. component in the further part of the equipment. The plate current of tube V–1 therefor carries the information in pulse amplitude modulation with the skew-pulses as carriers. Waveform *a* in Fig. 4 demonstrates this fact.

In this particular embodiment it is intended to handle packages of 36 pulses at a time. The first pulse at the left side of Fig. 4 is the 36th pulse of one packet. Thereafter comes the first pulse of a new packet and so on until with the 36th pulse again when a packet is completed and can be released. Pulse one will thus be stored for the longest time and pulse 36 for the shortest time. Following pulse one, which is developing a voltage drop across load resistor R–2, it is seen entering the delay network N1 over capacitor C–2 and it will appear after half the delay time at the tapping of N1 (waveform *b* in Fig. 4) which leads over capacitor C–9 to tube V–3. This tube however is blocked at its first grid by a sufficiently large bias $-G_{co}$. No signal will therefore appear at this time in the output R–9, C–8. The pulse one reaches finally the output of the network N1 and appears over transformer TR–3 at the first grid of tube V–2 (waveform *c* of Fig. 4). It is now amplified and re-enters over transformer TR–2 the delay network. Immediately after the first pulse has passed at the first tapping of network N1 the second pulse will be inserted over C–2 and will follow closely pulse one through the network. This process continues until pulse 36 has joined the group. This is demonstrated in interval 447 in Fig. 4. When the complete group of 36 pulses now appears at the second tapping of the network N1, tube V–3 is rendered conducting by a simultaneous gating action of a positive gating pulse at grid one, arriving over input *f* (waveform *f* in Fig. 4) and the RC elements R–7 and C–6, and a negative timing pulse (waveform *e* of Fig. 4) arriving over terminal *e* and capacitor C–5 towards cathode resistor R–6. The positive cathode potential $+G_{co}$ has to secure the perfect blocking of tube V–3 to such an extent that neither waveform *f*, nor waveform *e* alone can open the tube, but only their combined action.

To prevent any accumulation of noise and disturbances inside the delay circle, it is necessary to clean the network by blocking tube V–2 at grid 3 after the 36th pulse has passed it. This is done by waveform *d* (Fig. 4) over input *d* (Fig. 3) and RC elements R–3, C–3.

To secure unity gain over the whole loop, there is provision for a pulsive A. G. C. (automatic gain control) system, acting on pulse 451 (Fig. 4). This is an A. C.-burst of a very high frequency. It is inserted into the delay circle along with waveform *d*. Network N2 is a band-pass network which is tuned to the A. C.-frequency of this burst. Over a diode D an A. G. C.-control voltage is developed across R–5, C–4.

Having thus described the invention by way of example, giving a specific circuit, it may be realized that many additional circuit arrangements and variations thereof are possible without departing from the invention. It is to be understood therefore that the embodiments herein shown and described are to be regarded as illustrative of the invention only and not as restricting the scope of the invention as set forth in the objects and the appended claims.

What I claim is:

1. An electric memory system to store information by modulating electrical pulses and circulating said pulses in a given sequence permanently over one or more closed loops of convenient circulation time, said system comprising means for generating electrical pulses, means for modulating said pulses, said system comprising storage means for circulating said pulses permanently, means for preserving the waveforms of the pulses stored in said storage means, means for marking and identifying the first pulse of any sequence stored in said storage means, switching means for releasing the stored pulse train from said storage means in the correct sequence whenever triggered by an external signal, means for demodulating said modulated pulse sequence, said storage means comprises several closed loop storage devices, said loops being of different lengths and each having a circulation time equal to an integer multiple of the circulation time of the shortest loop, wherein said means for generating electrical pulses produce pulses of extremely short duration compared with their repetition period, said repetition period of the pulses is exactly an integer multiple of the circulation time of the first loop to be used by the pulses plus slightly more than one maximum modulation interval of a single modulated pulse, comprising means to transfer said pulses from one loop to the next one whenever space has become available in the next one.

2. An electric memory device as set forth in claim 1, wherein the pulses first enter a relatively short loop from which they are transferred by said switching means to a longer loop as soon as the first loop is filled up to the limit of the storage capacity and wherein the pulses are again transferred to a larger loop as soon as said second loop is likewise filled and so on until the pulses have reached the largest loop, which forms the storage device proper.

3. An electric memory device as set forth in claim 1, wherein the first pulses of a series stored in the system are circulated in the last loop, which is of relatively small size and short circulation time and the following parts of the complete pulse train are stored in longer and longer loops until the largest part of the pulse series up to its end is stored in the longest loop, and wherein the output of the system is connected to the last loop and said switching means transfer automatically the pulses in their correct sequence from a larger loop to the next smaller loop whenever the latter has been sufficiently emptied in the course of the discharge process of the storage device.

4. An electric memory device as set forth in claim 2, wherein the first pulses of a series stored in the system are circulated in the last loop, which is of relatively small size and short circulation time, the following parts of the complete pulse train are stored in longer and longer loops until the largest part of the pulse series up to its end is stored in the longest loop, and the output of the system is connected to the last loop and said switching means transfer automatically the pulses in their correct sequence from a larger loop to the next smaller loop whenever the latter has been sufficiently emptied in the course of the discharge process of the storage device.

5. An electric memory device as set forth in claim 2, wherein additional switching means are provided which connects the input at the beginning of a charging process first to the last and smallest loop closest to the output and when this loop is filled they connect the further pulses to the smallest loop at the input side, from where they are transferred first to the last-but-one loop at the output side and so on until first all output loops are filled and further synchronising means to secure the correct sequence of the pulses in all charging and discharging actions.

6. An electric memory device as set forth in claim 3, wherein additional switching means are provided which connect the input at the beginning of a charging process first to the last and smallest loop closest to the output and when this loop is filled they connect the further pulses to the smallest loop at the input side, from where they are transferred first to the last-but-one loop at the output side and so on until first all output loops are filled and further synchronising means are provided to secure the correct sequence of the pulses in all charging and discharging actions.

7. An electric memory device as set forth in claim 4, wherein additional switching means are provided which connect the input at the beginning of a charging process first to the last and smallest loop closest to the output and when this loop is filled they connect the further pulses to the smallest loop at the input side, from where they are transferred first to the last-but-one loop at the output side and so on until first all output loops are filled and wherein further synchronising means are provided to secure the correct sequence of the pulses in all charging and discharging actions.

References Cited in the file of this patent

UNITED STATES PATENTS 2,729,803 Harrison ---------------- Jan. 3, 1956